United States Patent [19]

Tournier

[11] Patent Number: 5,359,650
[45] Date of Patent: Oct. 25, 1994

[54] DIGITAL CIRCUIT FOR CONDITIONAL INITIALIZATION

[75] Inventor: Christian Tournier, Seyssinet, France

[73] Assignee: SGS-Thomson Microelectronics, S.A., Gentilly, France

[21] Appl. No.: 114,292

[22] Filed: Aug. 30, 1993

Related U.S. Application Data

[63] Continuation of Ser. No. 720,026, Jun. 24, 1991, abandoned.

[30] Foreign Application Priority Data

Jun. 26, 1990 [FR]  France .................. 90 07985

[51] Int. Cl.⁵ .............................. H04M 3/00
[52] U.S. Cl. .................. 379/342; 379/413; 379/377
[58] Field of Search ............... 379/342, 413, 362, 377

[56] References Cited

U.S. PATENT DOCUMENTS

| | | | |
|---|---|---|---|
| 3,997,740 | 12/1976 | Eubank et al. | 379/362 X |
| 4,087,649 | 5/1978 | Kerman et al. | 379/362 X |
| 4,227,054 | 10/1980 | Gilmer | 379/342 |
| 4,266,099 | 5/1981 | Kayalioglu et al. | 379/342 X |
| 4,278,842 | 7/1981 | Simmons | 379/342 X |
| 4,289,933 | 9/1981 | Henry | 379/342 |
| 4,347,406 | 8/1982 | Zurawski | 379/342 |
| 4,388,499 | 6/1983 | Janssen | 379/362 |
| 4,590,432 | 5/1986 | Di Borgoricco | 328/164 |

FOREIGN PATENT DOCUMENTS

| | | |
|---|---|---|
| 0266837 | 5/1988 | European Pat. Off. . |
| 2082355 | 3/1982 | United Kingdom . |

OTHER PUBLICATIONS

Ott, "Eight-Bit CMOS Microcomputer Unit Ideal For Intelligent Telephone Systems", *Mini-Micro Conference Record,* pp. 1–5 (May 1984).

Primary Examiner—James L. Dwyer
Assistant Examiner—M. W. Shehata

[57] ABSTRACT

The invention relates to remotely powered circuitry, and in particular to telephones. The circuit of the invention uses a counter to measure or compare the duration of power supply interruptions on the remote power supplying line to cause the remotely powered circuitry to be initialized whenever the duration of such an interruption becomes greater than or less than a specified duration. Advantageously, comparators are used so as to be able to take a plurality of durations into consideration. Thus, each time the power supply on the remote power line is interrupted, if the interruption is not of an acceptable duration, then the remotely powered circuitry is initialized.

31 Claims, 3 Drawing Sheets

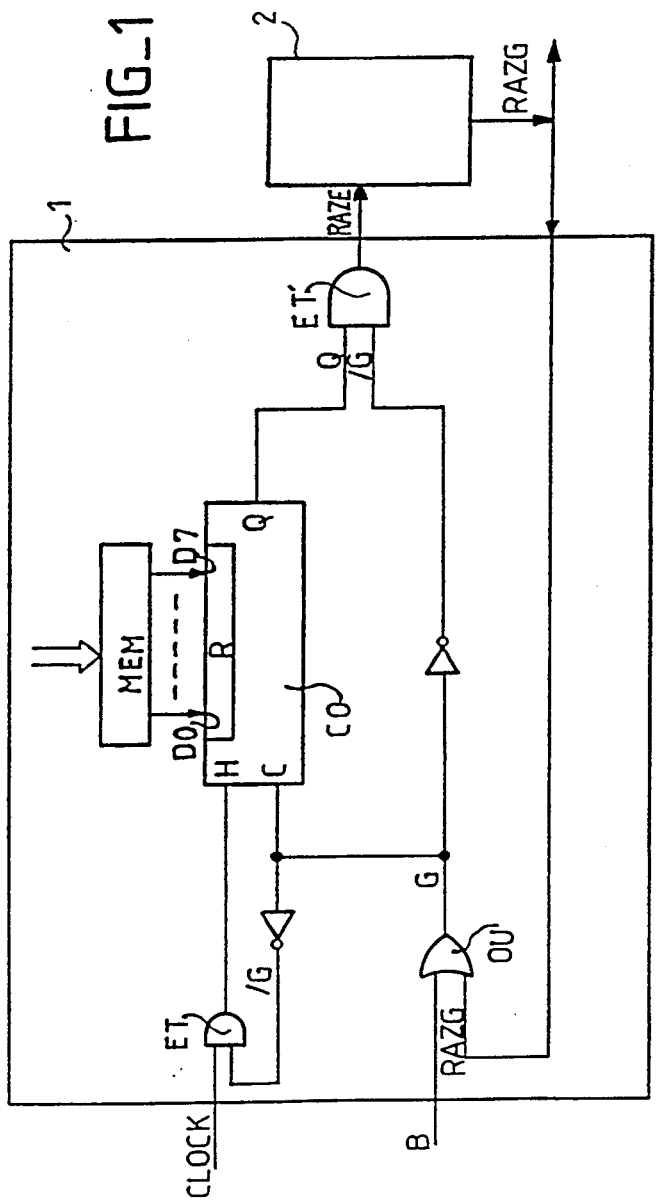

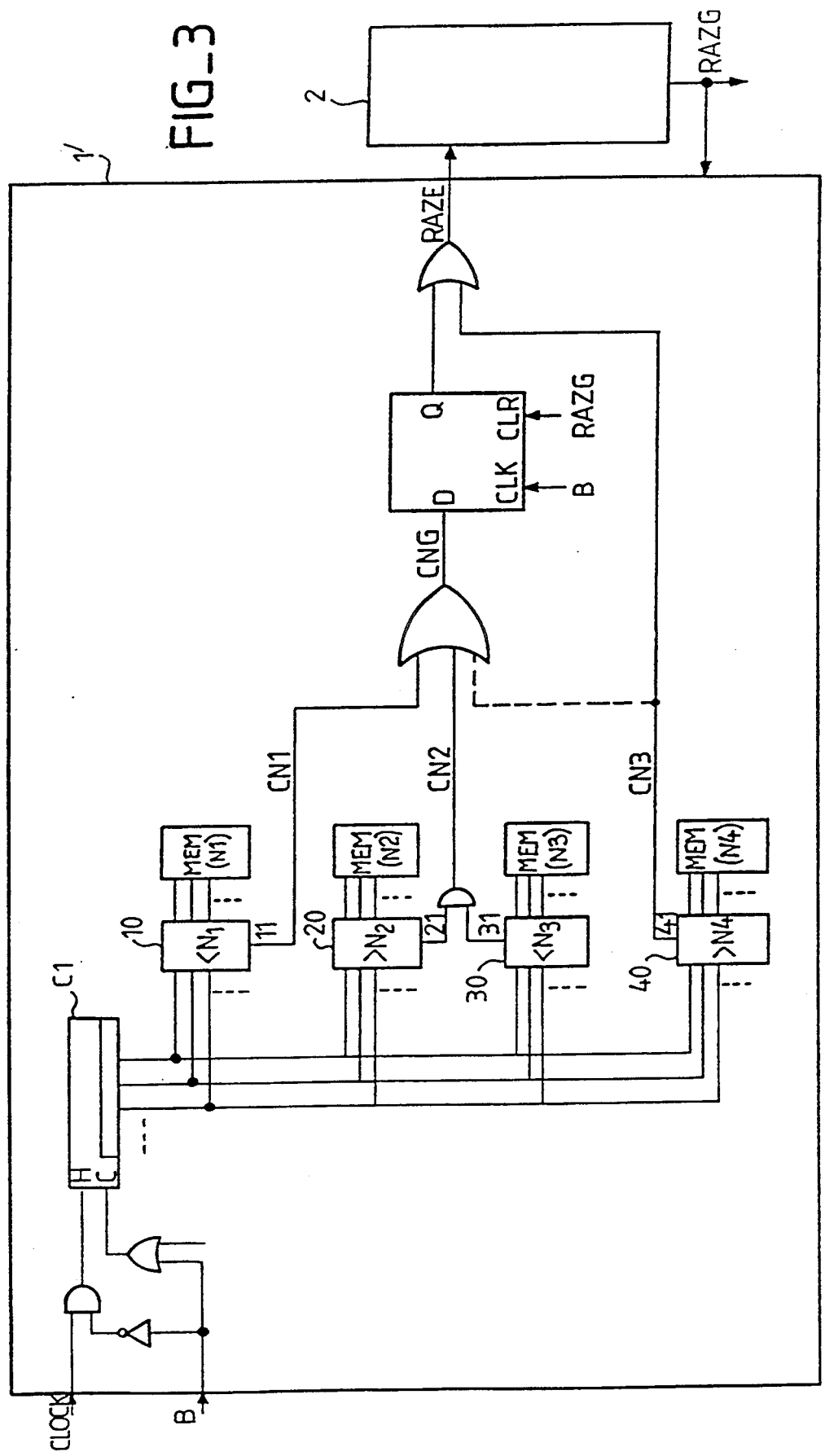

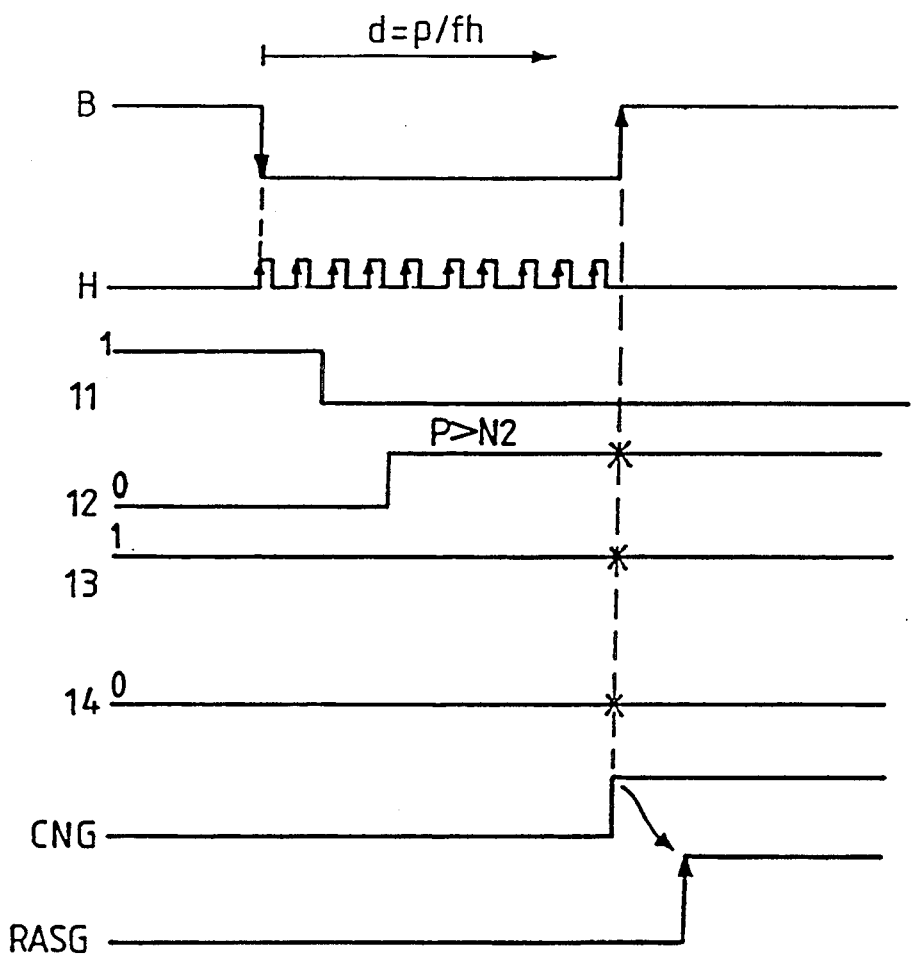
FIG_4
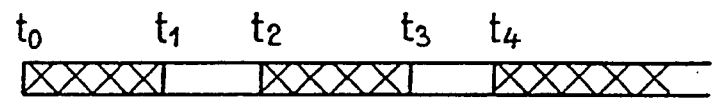
FIG_5

DIGITAL CIRCUIT FOR CONDITIONAL INITIALIZATION

This is a continuation of application Ser. No. 07/720,026, filed Jun. 24, 1991, now abandoned.

FIELD OF THE INVENTION

The invention relates to a circuit for conditional initialization of a remotely powered circuit. In particular, it enables the circuitry of a telephone set or of an alarm system for monitoring private houses to be initialized conditionally.

BACKGROUND OF THE INVENTION

Remotely powered circuits do not have a local power supply: i.e. battery, or power supply unit. The energy they require is conveyed to them over the transmission lines to which they are connected.

For a telephone, the energy is conveyed by the telephone line. Depending on the type of telephone, i.e. whether it uses tone dialing or pulse dialing, energy is not always present on the line. With tone telephones, dialing is done by frequency modulation, i.e. by modulating the current on the telephone line. Energy is always present on the line.

For telephones using pulse dialing, each digit (0 to 9) is represented by a corresponding number of pulses, each having a certain duration or a certain characteristic on the telephone line.

A pulse is obtained by short-circuiting the telephone line, which has the effect of making energy unavailable during each pulse. These power supply interruptions are of fixed duration since they satisfy the characteristics required for dial pulses.

The invention is particularly applicable to pulse dialing. The circuitry of the telephone must be capable of accepting power supply interruptions of fixed duration corresponding to dialing. However it should not tolerate power supply interruptions that do not correspond to dial pulse characteristics: e.g., faulty operation, line breaks, etc. Under such circumstances it must be reinitialized. That is why the term "conditional initialization" is used: initialization is conditional on an interruption of power supply lying outside an acceptable range.

The circuitry of such a digital telephone set essentially comprises two electronic portions: a bipolar logic portion for controlling the interface between the telephone set and the telephone line; and a microprocessor for controlling the telephone keypad, in particular, and for sending instructions to the bipolar logic.

In addition, it is the bipolar logic that performs the voltage regulation function for the microprocessor and which controls conditional initialization of the microprocessor (by controlling a reset pin thereof).

During dialing, the bipolar logic short-circuits the telephone line for each dial pulse and for a predetermined length of time, and it puts the output of its voltage regulator into a high impedance state so as to decouple the voltage regulator from the microprocessor. The microprocessor is then powered by discharging a back-up capacitor.

In contrast, the reset pin will be subjected to fluctuations relating to the state of the telephone line. Since it is necessary to prevent the microprocessor (and the telephone circuitry in general) from being reset during dialing, and since it is also necessary to reset the microprocessor during power supply interruptions that do not correspond to dialing, it is the practice to use a set of discrete components, capacitors, diodes, resistance networks, and transistors, for the purpose of stabilizing the state of the reset pin during power supply interruptions of acceptable characteristics (dialing).

This stabilization circuit is bulky and is installed between the bipolar logic and the microprocessor. An object of the invention is to omit this additional stabilization circuit, thereby eliminating problems of bulk and of calibrating the values of its components. Another object of the invention is to make use of items that are programmable so as to provide a conditional initialization circuit that is flexible and adaptable.

SUMMARY OF THE INVENTION

The present invention therefore provides a conditional initialization circuit for circuitry that is remotely powered over a transmission line for transmitting pulses obtained by short-circuiting the transmission line for specific durations, with short-circuiting of the transmission line causing the power supply to the remotely powered circuitry to be interrupted, with power to the remotely powered circuit being maintained by means of a capacitor during such a short-circuit, wherein the conditional initialization circuit includes a counter for measuring the duration of a short-circuit, and means for comparing the duration of a short-circuit with at least one specified duration, to cause the remotely powered circuitry to be initialized if the duration of a short-circuit is less than or greater than a specified duration.

BRIEF DESCRIPTION OF THE DRAWINGS

Other characteristics and advantages of the invention are described by way of the non limiting examples in the following description which is made with reference to the accompanying drawings, in which:

FIG. 1 is a block diagram showing the internal functions of a conditional initialization circuit constituting a first embodiment of the invention;

FIG. 2 is a timing diagram showing the operation of the conditional initialization circuit constituting the first embodiment of the invention;

FIG. 3 is a block diagram showing the internal functions of a conditional initialization circuit constituting a second embodiment of the invention;

FIG. 4 is a timing diagram showing the operation of the second embodiment of the conditional initialization circuit of the invention; and FIG. 5 shows one example of the pulse characteristics that can be accepted by the conditional initialization circuit constituting the second embodiment of the invention.

DETAILED DESCRIPTION OF THE PREFERRED EMBODIMENTS

FIG. 1 is a block diagram of the internal functions of a conditional initialization circuit constituting a first embodiment of the invention. In this circuit the initialization condition is simple: if the duration d of a pulse present on the line being monitored is less than or greater than, e.g. greater than, a duration d0 corresponding to a determined characteristic, then initialization takes place. For a telephone, the line being monitored is the telephone line and the single characteristic (d0) could correspond to dial pulse duration.

The conditional initialization circuit 1 has an input pin B which is connected to the remote power supply line being monitored (e.g. a telephone line). It includes a counter CO provided with a presettable register R, a clock input H, an initialization input C (for "clear") and a pulse output Q. A circuit 2 for controlling circuit initialization provides a general initialization command RAZG for the circuitry as a whole. The circuit 2 has an input connected to receive the output RAZE from the initialization circuit. It may receive other inputs: for example in a telephone application it receives a flag signal COMB indicating that the telephone is "off-hook". The output RAZG constitutes, in particular, an initialization signal for the conditional initialization circuit 1.

In this first embodiment, an OR gate OU has one input connected to receive the signal B that is being monitored and another input connected to receive the general initialization signal RAZG, and it produces an output signal G.

This signal G is connected to the clear input C of the counter CO. The inverse thereof, /G, is connected to one input of an AND gate ET. The other input of the AND gate ET is connected to receive a clock signal CLOCK. The output from the AND gate ET constitutes the clock input H to the counter.

The presettable register R of the counter is initialized on clearing to a value n presented on inputs D0–D7 of the counter, for example. The value n may be presented by a memory register MEM. It could also be presented by a microprocessor.

The Q output from the counter and the inverted output /G from the above-described OR gate OU constitute inputs to an AND gate ET'. The output from the AND gate ET' constitutes the output RAZE of the conditional initialization circuit 1.

In addition, in this embodiment, the following conventions are used concerning the active levels of the various signals:
 the signal B is active low: in the present case, a low level on B corresponds to a power supply interruption;
 the beginning of the interruption thus corresponds to a falling edge and the end of the interruption to a rising edge;
 the signal RAZG is active high: a high level of the signal causes general initialization of the circuit to take place;
 the signal C is active high, i.e. a high level on C clears the counter;
 on receiving a rising edge on its clock input H, the counter decrements its register R by unity;
 the signal Q is active high and the Q output is a pulse output: when the register R passes through 0, a "positive" pulse appears on the Q output; and
 the signal RAZE follows the same convention as the signal Q.

Such a circuit thus operates as follows:

General initialization of the circuit caused by RAZG taking up a high level (RAZG=1) causes the counter to be cleared. In particular, the presettable register R is initialized when the signal RAZG takes up a high state (rising edge) to a value n which is present on the inputs D0–D7 of the counter. In addition, while the signal RAZG is at 1, the signal /G is at 0 and prevents the clock signal CLOCK from being transmitted to the clock input H of the counter: the counter is stopped. It may be observed that the signal B taking up the 1 state has the same effects.

When RAZG is 0, if the signal B goes to 0, i.e. in the present example when there is a power supply interruption on the telephone line, the signal /G goes to 1 and thus allows CLOCK to be transmitted to the clock input H. On each clock pulse, e.g. on each rising edge applied to the clock input H, the register R is decremented by unity. If the register R began by containing the value n, then after n clock pulses it would contain the value zero: i.e. after a certain time lapse $t_r = n/f_h$, where $f_h$ is the frequency of the clock, the register contains the value zero. At the end of this time lapse $t_r$, which is referenced relative to a time t0 when the signal B switched to the low level (a falling edge in B), a positive pulse appears at the Q output of the counter.

If the signal B is still at zero, then the negative pulse on B is longer than the time lapse $t_r$ counted by the counter: the rising edge in the signal RAZE causes a general initialization of the circuit to occur.

If the signal B switches back to 1 before the register R reaches 0, or at the same moment as the register R switches to 0, then general initialization does not take place and RAZE remains at 0. The counter is reinitialized as described above by the rising edge in B.

The operation described above is defined by the following equations:

$$H = NOT(B \text{ OR } RAZG) \text{ AND } CLOCK$$

$$C = (B \text{ OR } RAZG)$$

$$RAZE = NOT(B \text{ OR } RAZG) \text{ AND } Q$$

AND Q

This operation is also illustrated by the timing diagram of FIG. 2 which corresponds to a power supply interruption of duration d greater than the designed duration $d0 = n/f_h$.

This first embodiment of a conditional initialization circuit thus serves to initialize the circuitry whenever an interruption on the remote power supply line lasts longer than a determined duration d0, and it does this by using a counter having a clock frequency $f_h$, which counter is started on the appearance of the interruption, with the determined duration d0 being calculated by counting down from the value n loaded into the counter such that $d0 = n/f_h$.

Unfortunately, although this circuit has the advantage of being simple, it is capable of taking in account one pulse characteristic only.

In a telephone application, the condition for acceptable pulses may comprise a set of characteristics as shown in FIG. 5: starting from a reference instant t0, any pulse of duration lying in the range (t1–t0; t2–t0) or in the range (t3–t0; t4–t0) may be acceptable, while pulses of durations lying outside these ranges require general initialization of the circuitry.

A second embodiment of a conditional initialization circuit as shown in FIG. 3 makes it possible to implement such complex conditions.

The conditional initialization circuit 1' of FIG. 3 includes a counter C1. As in the preceding circuit, the counter is cleared by the signals B or RAZG. In this case, when the counter is cleared, its count register is reset to zero. The register is incremented by clock pulses applied to the clock input H of the counter. The state of the counter is made accessible on counter output pins D0–D7. In this case, the clock signal CLOCK is transmitted to the clock input H of the counter under the control of the signal B, only. If B is at 1, the clock is not transmitted, whereas if B is at 0, transmission takes place. This constitutes a possible variant on the first embodiment of the conditional initialization circuit.

The output pins D0-D7 of the counter are connected to inputs A0-A7 of comparators. In this example there are four comparators 10, 20, 30, and 40. Each comparator compares its inputs A0-A7 with other inputs B0-B7 connected to a memory register associated with the comparator:

MEM (N1) for the comparator 10
MEM (N2) for the comparator 20
MEM (N3) for the comparator 30
MEM (N4) for the comparator 40

In the example, this comparison takes place on a permanent basis, since the state of the counter count register and the contents of the memory registers are permanently available on the inputs A0-A7 and B0-B7. The outputs 11, 21, 31, and 41 of the comparators 10, 20, 30, and 40 respectively are then used to generate various different conditions for causing initialization to take place.

In this example, a complex set of conditions is chosen as represented in above-described FIG. 5.

Relative to reference time t0, which corresponds to the signal B going to the low level, if the rising edge of the pulse on B appears earlier than t1, or between t2 and t3, or after t4, where t1<t2<t2<t4, then initialization must take place.

Thus, in the example, three conditions CN1, CN2, and CN3 give rise to general initialization. Let p be the contents of the count register corresponding to the duration d of the pulse on B multiplied by the clock frequency $f_h$, i.e. $p = d.f_h$. Let $N_i = (t_i - t_0) \times f_h$ for i=1 to 4, for each of the times ti of the complex characteristic chosen (FIG. 5). Then:

CN1 corresponds to p<N1;
CN2 corresponds to p>N2 AND p<N3; and
CN3 corresponds to p>N4.

All pulses whose rising edges occur between t1 and t2 or between t3 and t4 are acceptable and do not give rise to initialization. The conditions CN1, CN2, and CN3 are generated from the outputs of the comparators and by means of logic AND, OR, and NOT gates. In the example, the comparator 10 provides a true output if p<N1, the comparator 20 if p>N2, the comparator 30 if p<N3 and the comparator 40 if p>N4. By convention, the output of the comparator is at a 1 state when the comparison performed by the comparator is true. Under these conditions, CN1 is obtained by taking the output 11 from the comparator 10, CN2 by combining the outputs 21 and 31 of comparators 20 and 30 in a logic AND gate; and CN3 by taking the output 41 of comparator 40.

The conditions CN1, CN2, and CN3 are thus true if they are at the high level. It thus suffices to apply the three conditions CN1, CN2, and CN3 as inputs to a logic OR gate in order to obtain a general initialization-provoking condition CNG.

Nevertheless, the comparison which is of interest is the one which takes place when signal B terminates, i.e. when a rising edge appears on signal B. Unfortunately, the comparators in the present example compare on a continuous basis. The condition CNG should therefore only be taken into account on the rising edge in B. This can be done merely by using a storage component which stores the condition CNG on said rising edge. In the example, a D-type bistable is used, with the signal CNG being applied to the D input thereof and the signal B being applied to the CLK input thereof. When a rising edge appears on B, then the signal CNG is transmitted to the output Q. It is this output Q that then causes initialization to take place.

For the comparison with the longest duration (condition p>N4), a simple improvement makes it possible to avoid waiting for the end of the pulse on B: in this example the output CN3 is combined in a logic OR gate with the Q output from the bistable.

The output RAZE from the OR gate is connected to the input of the initialization control circuit 2 which delivers the general initialization control signal RAZG. When RAZG is activated, it also serves to reset the D-type bistable to 0. A timing diagram corresponding to the circuit 1' is given in FIG. 4, for the case where p>N2 and p<N3.

The circuit 1' has as many comparators as are required for implementing the general initialization condition corresponding to a determined characteristic. There are no particular limits thereon.

It is quite possible to trigger comparison only on the rising edge in B. However the comparison time would then be longer than in the example described which uses "tracking" comparators that compare on a permanent basis.

In any event, this digital circuit is easily implemented by a microprocessor. In particular, it can easily be integrated in a microprocessor dedicated to telephone applications.

Some functions of the device may be performed by microprograms, e.g. the comparison and generation of the general condition in the circuit constituting the second embodiment of the invention (FIG. 3).

All of these variants remain within the scope of the invention. In a telephone application, since the conditional initialization circuit can be an integrated circuit or may be implemented by the microprocessor, there is no longer an analog circuit between the bipolar circuit and the microprocessor. Nor is there any need to adjust component values (resistances, capacitances) and the use of such a circuit is more flexible because it can be programmed (by changing the values loaded into the counter, the values loaded into the comparators, and the signs of the comparisons).

What is claimed is:

1. A conditional initialization circuit, for circuitry that is remotely powered over a transmission line, and transmits pulses by short-circuiting the transmission line for specific durations, and is temporarily powered from a capacitor during such a short-circuit, wherein the conditional initialization circuit comprises:

a counter for measuring the duration of a short-circuit, and at least one comparator means for comparing the duration of a short-circuit with at least one respective specified duration and for causing the remotely powered circuitry to be initialized if the duration of a short-circuit is less than the minimum value or greater than the maximum value of a specified range of durations.

2. A conditional initialization circuit according to claim 1, wherein said comparator means includes multiple comparators, with each comparator comparing the duration of a short-circuit with a respective specified duration.

3. A conditional initialization circuit according to claim 2, for a plurality of specified durations and including one comparator per different specified duration, wherein said counter counts at a clock frequency and said counter is reset to zero on initialization of the remotely powered circuitry and at the beginning of a short-circuit of the transmission line, said counter beginning to count at said frequency from the beginning of a short-circuit of the transmission line and ceasing to count when said short-circuit ends or on the remotely powered circuit being initialized, each comparator being connected to an output from the counter to be compared with a specific duration, the outputs from said comparators being combined with one another by logic gates so as to generate a general initialization condition for the remotely powered circuitry.

4. A conditional initialization circuit according to claim 3, wherein the general initialization condition of the remotely powered circuitry is taken into account for initializing said remotely powered circuitry only when the short-circuit comes to an end.

5. A conditional initialization circuit according to claim 4, wherein initialization of the remotely powered circuitry is applied whenever the general initialization condition for the remotely powered circuitry is fulfilled and the short-circuit has come to an end or the duration of the short-circuit exceeds a longest specified duration.

6. A conditional initialization circuit according to claim 1, wherein said counter counts down at a clock frequency and is initialized to a value equal to the first specified duration at said clock frequency whenever the remotely powered circuit is initialized and also whenever a short-circuit begins on the transmission line, the counter then beginning to count down at said clock frequency from the beginning of a short-circuit on the transmission line and ceasing to count down at the end of the short-circuit or on initialization of the remotely powered circuitry, said counter being connected to cause said remotely powered circuitry to be initialized whenever said counter reaches a zero value.

7. The conditional initialization circuit of claim 1, wherein said comparator means includes at least four comparators,
    wherein a first one of said comparators produces a first output signal indicating whether the measured duration is greater or less than a first specific duration,
    wherein a second one of said comparators produces a second output signal indicating whether the measured duration is greater or less than a second specific duration which is greater than said first duration,
    wherein a third one of said comparators produces a third output signal indicating whether the measured duration is greater or less than a third specific duration which is greater than said second duration, and
    wherein a fourth one of said comparators produces a fourth output signal indicating whether the measured duration is greater or less than a fourth specific duration which is greater than said third duration,
    and further comprising logic operatively connected to receive said four output signals and to cause the remotely powered circuitry to be initialized whenever said output signals indicate that the measured duration is less than said first duration, or greater than said second duration and less than said third duration, or greater than said fourth duration.

8. The conditional initialization circuit of claim 1, wherein the specified range of durations includes two non-overlapping ranges.

9. A conditional initialization circuit, for circuitry that is remotely powered over a transmission line and transmits pulses by short-circuiting the transmission line for specific durations and is temporarily powered from a capacitor during such a short-circuit and includes a general initialization circuit for producing a general initialization signal, said conditional initialization circuit comprising:
    a clock for providing clock pulses,
    a counter connected to receive said clock pulses and configured to measure the duration of a short-circuit of said transmission line and to provide an output accordingly,
    at least one comparator for comparing the duration of a short-circuit of said transmission line, as measured by said counter, with at least one specified duration and providing an output signal responsive to the comparison, and
    an output circuit for receiving said output signal and for applying a conditional initialization signal to said general initialization circuit, to cause the general initialization circuit to produce a general initialization signal to initialize the remotely powered circuitry, if the duration of a short-circuit, as measured by said counter, is less than off the minimum value or greater than the maximum value of an acceptable range of durations.

10. A conditional initialization circuit according to 9, wherein the comparator includes a plurality of separate comparators, with each separate comparator comparing the measured duration of a short-circuit with a respective specified duration.

11. A conditional initialization circuit according to claim 10, wherein said counter counts said clock pulses, wherein the counter is reset to zero on initialization of the remotely powered circuitry and at the beginning of a short-circuit of the transmission line, wherein the counter begins to count said clock pulses at the beginning of a short-circuit of the transmission line and ceases to count on the first to occur of said short-circuit ending and the remotely powered circuit being initialized, each separate comparator being connected to an output from the counter to be compared with a specific duration, and wherein said output circuit combines the outputs from the separate comparators with one another by logic gates so as to generate said conditional initialization signal.

12. A conditional initialization circuit according to claim 11, wherein a first one of said separate comparators produces a first output signal if the measured duration is less than a first specific duration, wherein a second one of said separate comparators produces a second output signal if the measured duration is greater than a second specific duration, wherein a third one of said separate comparators produces a third output signal if the measured duration is less than a third specific duration, said third specific duration being greater than said second specific duration, wherein a fourth one of said separate comparators produces a fourth output signal if the measured duration is greater than a fourth specific duration, said fourth specific duration being greater than said third specific duration.

13. A conditional initialization circuit according to claim 12 wherein said output circuit comprises an AND circuit having one input thereof connected to the output of the second separate comparator and another input thereof connected to the output of the third separate comparator, a first OR circuit having one input thereof connected to the output of said first separate comparator and another input thereof connected to the output of said AND circuit, a D type bistable storage component, a first input of said bistable storage component being connected to the output of said first OR circuit, a second input of said bistable storage component being connected to said transmission line, a third input of said bistable storage component being connected to receive said general initialization signal, a second OR circuit having one input thereof connected to an output of said bistable storage component and a second input thereof connected to the output of the fourth separate comparator, the output of said second OR circuit being connected to an input of said general initialization circuit.

14. A conditional initialization circuit according to claim 11, wherein the general initialization condition of the remotely powered circuitry is taken into account for initializing said remotely powered circuitry only when the short-circuit comes to an end.

15. A conditional initialization circuit according to claim 11, wherein initialization of the remotely powered circuitry is applied whenever the general initialization condition for the remotely powered circuitry is fulfilled and the short-circuit has come to an end or the duration of the short-circuit exceeds a longest specified duration.

16. A conditional initialization circuit according to claim 9, wherein said counter has an initialization input and a pulse input; and wherein said monitoring component for monitoring said transmission line and for passing clock pulses from said clock to said counter when a short-circuit of said transmission line occurs comprises an OR circuit having first and second inputs, said first input of said OR circuit being adapted to receive a signal indicative of the occurrence of a short-circuit of said transmission line, said second input of said OR circuit being connected to said general initialization circuit to receive said general initialization signal, the output of said OR circuit being connected to said initialization input of said counter to reset said counter, an AND circuit having first and second inputs, the first input of said AND circuit being connected to said clock and the output of said AND circuit being connected to the pulse input of said counter, and an inverter connected between the output of said OR circuit and the second input of said AND circuit.

17. A conditional initialization circuit according to claim 16, wherein said output circuit comprises a second AND circuit having first and second inputs, said first input of said second AND circuit being connected to the output of said comparator for receiving said output signal, an inverter connected between the output of said OR circuit and the second input of said second AND circuit, the output of said second AND circuit being connected to an input of said general initialization circuit.

18. A conditional initialization circuit according to claim 9, wherein said counter counts down at the frequency of said clock pulses and is initialized to a value equal to said specified duration multiplied by the frequency of said clock pulses whenever a short-circuit begins on said transmission line, the counter then beginning to count down at said clock frequency from the beginning of a short-circuit on said transmission line and ceasing to count down at the end of the short-circuit or on initialization of the remotely powered circuitry, said counter being connected to cause the remotely powered circuitry to be initialized whenever said counter reaches a zero value.

19. A conditional initialization circuit according to claim 9, wherein said counter has an initialization input and a pulse input; and wherein said monitoring component for monitoring said transmission line and for passing clock pulses from said clock to said counter when a short-circuit of said transmission line occurs comprises an OR circuit having first and second inputs, said first input of said OR circuit being adapted to receive a signal indicative of the occurrence of a short-circuit of said transmission line, said second input of said OR circuit being connected to said general initialization circuit to receive said general initialization signal, the output of said OR circuit being connected to said initialization input of said counter to reset said counter, an AND circuit having first and second inputs, the first input of said AND circuit being connected to said clock and the output of said AND circuit being connected to the pulse input of said counter, and an inverter connected between the first input of said OR circuit and the second input of said AND circuit.

20. The conditional initialization circuit of claim 9, comprising at least four said comparators,
   wherein a first one of said separate comparators produces a first output signal indicating whether the measured duration is greater or less than a first specific duration,
   wherein a second one of said separate comparators produces a second output signal indicating whether the measured duration is greater or less than a second specific duration which is greater than said first duration,
   wherein a third one of said comparators produces a third output signal indicating whether the measured duration is greater or less than a third specific duration which is greater than said second duration, and
   wherein a fourth one of said separate comparators produces a fourth output signal indicating whether the measured duration is greater or less than a fourth specific duration which is greater than said third duration,
   and further comprising logic operatively connected to receive said four output signals and to apply said conditional initialization signal to said general initialization circuit whenever said output signals indicate that the measured duration is less than said first duration, or greater than said second duration and less than said third duration, or greater than said fourth duration.

21. The conditional initialization circuit of claim 9, wherein the specified range of durations includes two non-overlapping ranges.

22. An initialization circuit, for automatically providing reset signals to associated circuitry which is remotely powered over a transmission line, comprising:
   an input connection for receiving an input signal which is in a first state when voltage appears on the transmission line;
   first and second counters each
      connected to receive a clock signal, and
      connected to receive a data input, and
      connected to receive said input signal as a respective reset input, and configured to load in the value of said data input and begin counting whenever said output of said comparator ceases to be in said first state, and
      configured to provide a respective count output signal after a number of said clock signals which is determined by the loaded-in value of said data input;

memory connected to provide different initial values to said respective data inputs of said first and second counters; and combining logic connected to receive said respective outputs of said first and second counters, and to provide a reset signal output to the associated circuitry if said count outputs of said first and second counters jointly assume a predetermined combination of logical states.

23. The circuit of claim 22, wherein said input signal is connected to a respective reset input of each said counter.

24. The circuit of claim 22, further comprising a comparator connected to substantially continuously monitor an analog signal corresponding to the voltage of the transmission line, and to generate said input signal in said first state when said analog signal is above a threshold level.

25. An initialization circuit, for automatically providing reset signals to associated circuitry which is remotely powered over a transmission line, comprising:

an input connection for receiving an input signal which is in a first state when voltage appears on the transmission line;

first, second, third, and fourth counters each
connected to receive a clock signal, and
connected to receive a data input, and
connected to receive said output of said comparator as a respective reset input, and configured to load in the value of said data input and begin counting whenever said output of said comparator ceases to be in said first state, and configured to provide a respective count output signal after a number of said clock signals which is determined by the loaded-in value of said data input;

memory connected to provide different initial values to said respective data inputs of said first and second counters; and combining logic connected to receive said respective outputs of said first and second counters, and to provide a reset signal output to the associated circuitry if said count outputs of said first, second, third, and fourth counters jointly assume a predetermined combination of logical states.

26. The circuit of claim 25, wherein said input signal is connected to a respective reset input of each said counter.

27. The circuit of claim 25, further comprising a comparator connected to substantially continuously monitor an analog signal corresponding to the voltage of the transmission line, and to generate said input signal in said first state when said analog signal is above a threshold level.

28. A conditional initialization circuit, for circuitry that is remotely powered over a transmission line and transmits pulses by short-circuiting the transmission line for specific durations and is temporarily powered from a capacitor during such a short-circuit and includes a general initialization circuit for producing a general initialization signal, said conditional initialization circuit comprising:

a clock for providing clock pulses, a counter connected to receive said clock pulses and configured to measure the duration of a short-circuit of said transmission line and to provide an output accordingly, a plurality of comparators each connected to compare the duration of a short-circuit of said transmission line, as measured by said counter, with at least one respective specified duration, and configured to provide an output signal accordingly, and an output circuit connected to receive said output signals and to apply a conditional initialization signal to said general initialization circuit, to cause the general initialization circuit to produce a general initialization signal to initialize the remotely powered circuitry, whenever the duration of a short-circuit, as measured by said counter, does not fall within a defined acceptable range of durations.

29. The circuit of claim 28, wherein said counter counts down at the frequency of said clock pulses and is initialized to a value equal to said specified duration multiplied by the frequency of said clock pulses whenever a short-circuit begins on said transmission line, the counter then beginning to count down at said clock frequency from the beginning of a short-circuit on said transmission line and ceasing to count down at the end of the short-circuit or on initialization of the remotely powered circuitry, said counter being connected to cause the remotely powered circuitry to be initialized whenever said counter reaches a zero value.

30. The circuit of claim 28, wherein the comparator includes a plurality of separate comparators, with each separate comparator comparing the measured duration of a short-circuit with a respective specified duration.

31. The circuit of claim 28, comprising at least four said comparators, wherein a first one of said separate comparators produces a first output signal indicating whether the measured duration is greater or less than a first specific duration, wherein a second one of said separate comparators produces a second output signal indicating whether the measured duration is greater or less than a second specific duration which is greater than said first duration, wherein a third one of said comparators produces a third output signal indicating whether the measured duration is greater or less than a third specific duration which is greater than said second duration, and wherein a fourth one of said separate comparators produces a fourth output signal indicating whether the measured duration is greater or less than a fourth specific duration which is greater than said third duration, and further comprising logic operatively connected to receive said four output signals and to apply said conditional initialization signal to said general initialization circuit whenever said output signals indicate that the measured duration is less than said first duration, or greater than said second duration and less than said third duration, or greater than said fourth duration.

* * * * *